Feb. 6, 1962 H. ZIMMERMANN ETAL 3,020,051
INDICATING DEVICE FOR THE CONTACT WEIGHT OF PHONOGRAPH PICK-UPS
Filed June 16, 1958 2 Sheets-Sheet 1
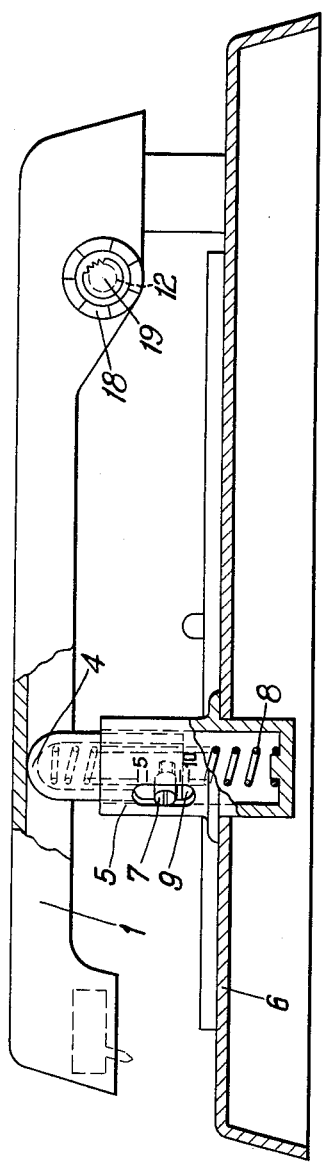
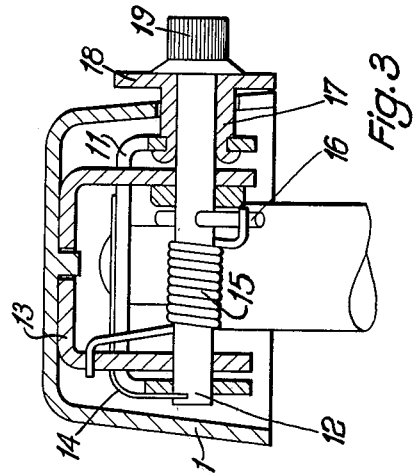
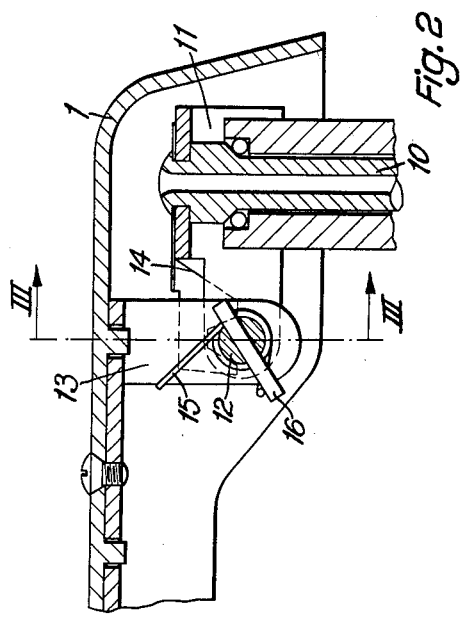
Inventors
H. Zimmermann and H. Hermann
by
J. J. Wille
ATTORNEY

United States Patent Office 3,020,051
Patented Feb. 6, 1962

3,020,051
INDICATING DEVICE FOR THE CONTACT WEIGHT OF PHONOGRAPH PICK-UPS
Heinrich Zimmermann and Hans Hermann, St. Georgen, Black Forest, Germany, assignors to Gebr. Steidinger K.G., St. Georgen, Black Forest, Germany, a German company
Filed June 16, 1958, Ser. No. 742,419
Claims priority, application Germany June 21, 1957
3 Claims. (Cl. 274—23)

This invention relates to an improvement in the adjustment of the needle contact pressure, in particular in combination with pick-ups designed to receive scanning systems of different type, in their head.

With a view to the fact that scanning systems of different type also have different dead weights and even the most favorable needle contact pressure is not the same, readjustment of the weights will be necessary when changing the system. This readjustment may be effected by means of a particular measuring balance which is, however, cumbersome in use and not easily operated by unskilled persons and mostly such balances are not available.

In the past, pick-ups have been provided with adjusting devices giving an indication of the needle contact pressure. However, these devices no longer give a correct indication as soon as the dead weight of the pick-up is altered, e.g. by changing the system. Further it has been proposed to use additional weights on the scanning system so that together with the installation of another scanning system simultaneously also another needle contact pressure is obtained (e.g. a smaller force with a system of otherwise equal weight of which one is used for records of micro-size and the other for records of normal size). The use of such additional weights may result in an undesirable increase of mass of an otherwise lightweight system and is not possible in practice with systems of different make. Even if additional weights are employed in order to enable the further use of an existing weight scale, this would involve constructional difficulties as in most cases the necessary space is not available behind the tone arm mounting when the apparatus subsequently is to be installed into the casing. Thus, with the hitherto known apparatuses persons not skilled in the art will not be in a position to insert scanning systems of different type into their pick-ups in a simple manner and without expedients and to have a play-back under optimal conditions.

The invention obviates these difficulties by providing the apparatus regularly with an indicating device which measures the effective needle contact pressure independently of any alteration of weight, the adjustment of the desired value being made by means of one of the known devices.

According to a particular embodiment of the invention the contact pressure adjusting device, known per se, is provided with adjusting marks which, however, do not carry numerals but are spaced in conformity with the spacing of marks on the measuring device properly speaking according to the invention. If e.g. after insertion of a new scanning system a value of 11 grams has been measured on the indicating device and the inserted system, however, may be played with 7 grams, the adjusting device requires to be readjusted only by 11 minus 7, i.e. by 4 graduation lines. Thus the desired contact pressure is readily adjusted in a single operation without much manipulation.

A particularly simple embodiment of the invention consists in designing the indicating device and the tone arm resting support as a combined structure.

Record players are frequently installed in radio-phonographs in a low position. In order to facilitate operation of the device it is further proposed to have the indicating scale disposed horizontally.

A particularly convenient arrangement as to facility of operation consists in designing the tone arm support as a hollow body with a lateral aperture through which the measuring lever projects outwardly to receive the tone arm. In this case the measuring device is used for measuring only. Such accommodation provides reliability of operation and does not impair the manipulation of the apparatus.

In the accompanying drawing:

FIG. 1 shows by way of example a side view of a tone arm on a base plate shown in section;

FIG. 2 is a sectional side view of the tone arm mounting on a larger scale;

FIG. 3 is a cross sectional view on the section line III—III of FIG. 2;

Figure 4:
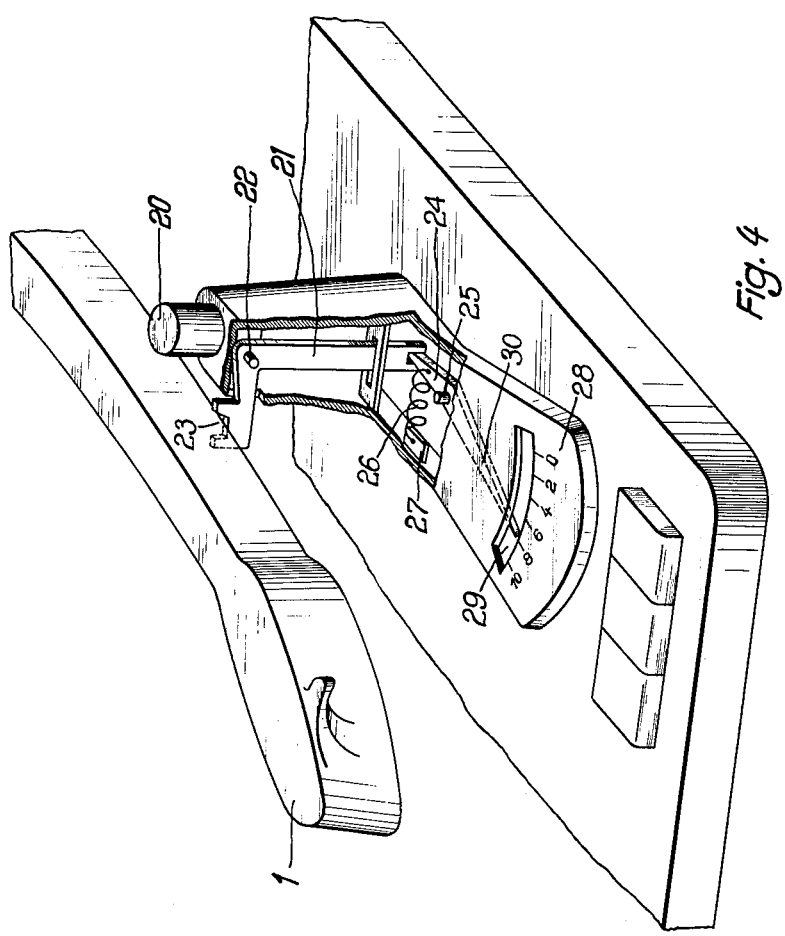
FIG. 4 shows as a further example a portion of a base plate together with a tone arm mounted thereabove, the tone arm being in its position for weighing.

A tone arm 1 is pivotally mounted by means of a horizontal shaft 12 and reposes on a tone arm support 4. The support 4 is telescopically guided in a sleeve 5 which is secured to the base plate 6. A guide pin 7 fastened to the support 4 and slidable within a slot 9 of the sleeve 5 simultaneously serves as a pointer for the compression stroke of a measuring spring 8.

A vertical tone arm shaft 10 has riveted thereto a shaft carrier 11. The tone arm 1 and its supporting yoke 13 are connected by means of the horizontal shaft 12 to the shaft carrier 11. A clamping spring 14 is secured to the shaft 12 with a predetermined friction moment against rotation. A coiled torsion spring 15 is braced with its one end against one end of a cross pin 16 carried by the shaft 12 and with its other end against the supporting yoke 13. The friction moment produced by the clamping spring 14 is in any case greater than the torque of the relieving spring 15. A bushing 17 carrying adjusting marks on its collar 18 is riveted into the shaft carrier 11.

The tension of the relieving spring 15 is adjustable by turning a knob 19 rigidly secured to the shaft 12.

The embodiment illustrated by way of example in FIG. 4 shows the balance disposed closely adjacent the tone arm support 20. A bell-crank lever 21 is mounted for rotation about a pivot 22. The horizontal arm of this bell-crank lever is formed with a notch-like recess 23 into which the tone arm 1 may be placed for weighing while the vertical arm of lever 21 is forked at its free end and embraces a rearward extension of a pointer lever 24 mounted for rotation about a pivot 25 secured to the casing. The restoring moment for the balance levers 21 and 24 is exerted by a tension spring 26 which at its one end is anchored in an eye 27 fixed to casing and its other end on the lever 24. The casing 28 is provided with an aperture 29 through which the tip region of the pointer arm 30 of horizontal balance lever 24 is visible.

What is claimed is:

1. In a record player for inetrchangeable pick-ups requiring different pressures for proper reproduction of sound from records, a tone arm, a pick-up supported in one end of the tone arm, a base plate, a vertical rotatable shaft extending upwardly from the base plate, a yoke on the tone arm at the end region of the tone arm remote from the pick-up, an extension integral with the yoke adjacent to and below the tone arm and projecting in the direction toward the pick-up, means interconnecting the yoke extension and the tone arm, a bracket at the upper end of the vertical rotatable shaft, a horizontal shaft rotatably supported in the bracket and supporting the yoke, a first spring attached at one end to the bracket and clamped at its other end to maintain the horizontal shaft in the yoke with a predetermined friction against rotation of the horizontal shaft, a second spring coiled about the horizontal shaft, a pin extending radially from the horizontal shaft, one end of the second spring being braced against the yoke surface toward the pick-up end of the tone arm and the other end of the second spring being braced against the radial pin, the tension of the first spring exceeding that of the second spring and being oppositely directed, means on the horizontal shaft externally to the tone arm for adjusting the tension of the second spring, a spring biased tone arm vertical support spaced from the vertical shaft and integral with the base plate engaging an intermediate region of the tone arm, equally spaced graduations on the tone arm support, an indicator on the tone arm support co-operating with the graduations to indicate the magnitude of the pressure exerted by the needle of the pick-up in the tone arm, and a second series of equally spaced graduations on the horizontal shaft for identifying the required magnitude and direction of rotation of the horizontal shaft in accordance with the difference between the actual reading of the indicater on the tone arm support and the desired reading thereof that the tension of the second spring is adjusted to produce the desired reading.

2. The combination according to claim 1 in which the tone arm support comprises a first hollow cylinder affixed to the base plate, a second hollow cylinder closed at its top slidable within the first cylinder, a spring within the second cylinder biasing the second cylinder against the tone arm, the first hollow cylinder defining an axial elongated slit, the equally spaced graduations being positioned axially the length of the elongated slit on the outer surface of the first cylinder, and the indicator is a pin extending radially from the second cylinder through the slit and cooperating with the graduations.

3. The combination according to claim 1 in which the tone arm support comprises a first pivoted angle lever of which an upper horizontally extending arm supports the tone arm, a second pivoted lever at substantially right angles to the first lever is horizontally in the base plate, a spring biasing the second lever, the vertical arm of the first angle lever is coupled to the arm of the second pivoted lever to which one end of the spring is connected, the other end of the spring being anchored in the base plate, and the spring biases the levers in such direction that the other arm of the second lever cooperates with the graduations in their increasing direction with increasing weight of the tone arm and pick-up pressure.

References Cited in the file of this patent

UNITED STATES PATENTS

| | | |
|---|---|---|
| 2,551,506 | Rockwell | May 1, 1951 |
| 2,693,363 | Proctor | Nov. 2, 1954 |
| 2,809,841 | Mueller | Oct. 15, 1957 |
| 2,882,059 | Da Costa | Apr. 4, 1959 |

FOREIGN PATENTS

| | | |
|---|---|---|
| 511,818 | Canada | Apr. 12, 1955 |